United States Patent
Casale et al.

(10) Patent No.: US 12,206,568 B1
(45) Date of Patent: Jan. 21, 2025

(54) REMOTE RADIO HEAD UNIT TESTER

(71) Applicant: Communications Test Design, Inc., West Chester, PA (US)

(72) Inventors: Paul Casale, Springfield, PA (US); Nick Gamber, Woolwich, NJ (US); Harold D. Bivins, Jr., Coatesville, PA (US); Matt Shank, Downingtown, PA (US); Jia Yang Chan, West Chester, PA (US); Patrick Schooley, Woolwich, NJ (US)

(73) Assignee: Communications Test Design, Inc., West Chester, PA (US)

( * ) Notice: Subject to any disclaimer, the term of this patent is extended or adjusted under 35 U.S.C. 154(b) by 0 days.

(21) Appl. No.: 18/797,627

(22) Filed: Aug. 8, 2024

(51) Int. Cl.
*H04L 43/50* (2022.01)
(52) U.S. Cl.
CPC .................................. *H04L 43/50* (2013.01)
(58) Field of Classification Search
CPC ...................................................... H04L 43/50
See application file for complete search history.

(56) References Cited

U.S. PATENT DOCUMENTS

2021/0345142 A1* 11/2021 Vierimaa .............. H04W 24/06
2024/0098660 A1*  3/2024 Maruyama ........... H04W 4/027

\* cited by examiner

Primary Examiner — Hsinchun Liao
(74) Attorney, Agent, or Firm — Bradley M. Brown

(57) ABSTRACT

A remote radio head unit tester and a method for testing a remote radio head unit is shown and described. The remote radio head tester includes a chamber having an interior volume. The chamber encloses electrical components, at least one of the electrical components is a computer which has a testing algorithm installed thereon. A frame secured to the chamber. At least one set of wires operably coupled with the electrical components. The remote radio head unit tester is configured to test a remote radio head unit by booting up the remote radio head unit. The remote radio head unit can only be booted up after the correct power cables and data cables have been connected to the remote radio head unit. Checking the software version of the remote radio head unit and updating the software. Testing the power connections of the remote radio head unit.

9 Claims, 6 Drawing Sheets

REMOTE RADIO HEAD UNIT TESTER

BACKGROUND OF THE INVENTION

Technology is always advancing and has done so at a rapid pace for the last several decades. Technology has become sophisticated, smaller, and accessible across the globe. This has led to technology becoming integral in everyday life. As with any integral element of life, the demand is high. This high demand has led to a rise in the cost of technological devices.

In addition to high demand, the simple replacement of devices can be expensive. If one merely discards older equipment or equipment with minor defects for a brand-new piece the cost can escalate quickly. If, however, technology is upgraded, or repaired this process can be much more cost effective for both the company and consumer.

Wireless technology has become an expected way of retrieving information. This expectation has led to an exponential increase in demand for wireless connectivity and wireless services. One-way wireless service is provided is via "cell towers." These towers include remote radio heads. These remote radio heads are wonderful pieces of technology which are still evolving. However, they can be expensive to produce. Further, as technology advances remote radio heads may need to be upgraded or replaced.

When upgrades are needed the entire unit may not need to be replaced with a new unit. Further, the old unit need not be discarded. In many instances, it is possible to replace the old unit with a different unit on the tower. Once replaced the old unit can be upgraded with either software or hardware. However, it can be difficult to readily ascertain what work needs to be done to properly refurbish, upgrade, and reuse the remote radio head. In some instances, this process can consume so many resources that this process becomes wasteful.

Many companies have been taking advantage of the repair instead of discard philosophy. Further, many consumers are happy purchasing a lightly used and repaired device instead of a brand new one. However, these processes come with new challenges in order to remain effective. Consequently, there is always a need for an improvement in the art.

SUMMARY OF THE INVENTION

The present invention provides a remote radio head unit tester wherein the same can be utilized for testing a remote radio head unit. The remote radio head unit tester includes a chamber having an interior volume. The chamber encloses electrical components. At least one of the electrical components is a computer which has a testing algorithm installed thereon. A frame secured to the chamber. At least one set of wires operably coupled with the electrical components.

Another object of the remote radio head unit tester is to have at least one screen operably connected to the electrical components.

Another object of the remote radio head unit tester is to have the screens configured to show the test results of the remote radio head test.

Another object of the remote radio head unit tester is to have the frame comprised of a plurality of legs and a cross structure.

Another object of the remote radio head unit tester is to have the cross structure allow for each set of the at least one set of wires to be suspended therefrom.

Another object of the remote radio head unit tester is to have at least one wire of the at least one set of wires is connected to a wire retracting tool.

Another object of the remote radio head unit tester is to have at least one server rack located within the chamber.

Another object of the remote radio head unit tester is to have the electrical components include, in addition to the at least one computer, at least wire connection and at least one server.

Another object of the remote radio head unit tester is to have a conveyer. The conveyer is positioned such that it moves at least one remote radio head into a position such that it can be connected to the at least one set of wires.

Another object of the remote radio head unit tester is to have a method for testing a remote radio head unit. The method including testing the power connections of the remote radio head unit. Connecting power cables to the remote radio head unit. Connecting the remote radio head unit to a remote radio head unit tester. Booting up the remote radio head unit. Checking the software version of the remote radio head unit. Testing the optical ports of the remote radio head unit.

Another object of the remote radio head unit testing method is to further include updating the software of the remote radio head.

Another object of the remote radio head unit testing method is to further include sending the remote radio head to repair after a failed test.

Another object of the remote radio head unit testing method is to further include displaying the test results from the remote radio head on a screen of the remote radio head tester.

Another object of the remote radio head unit testing method is to further include configuring the remote radio head tester to be operable with the remote radio head to be tested.

Other objects, features and advantages of the present invention will become apparent from the following detailed description taken in conjunction with the accompanying drawings.

BRIEF DESCRIPTION OF THE DRAWINGS

The accompanying drawings are incorporated in and are to be considered part of the present specification. These drawings are meant to aid the reader's understanding and comprehension of the present disclosure and are depictions of various example embodiments. The drawings are not to be considered limiting upon the disclosure. It should specifically be noted that the drawings are examples and may not necessarily be drawn to scale.

DETAILED DESCRIPTION OF THE INVENTION

For the purposes of presenting a brief and clear description of the present invention, a preferred embodiment will be discussed as used for the remote radio head unit tester. The figures are intended for representative purposes only and should not be considered to be limiting in any respect.

Figure 1:
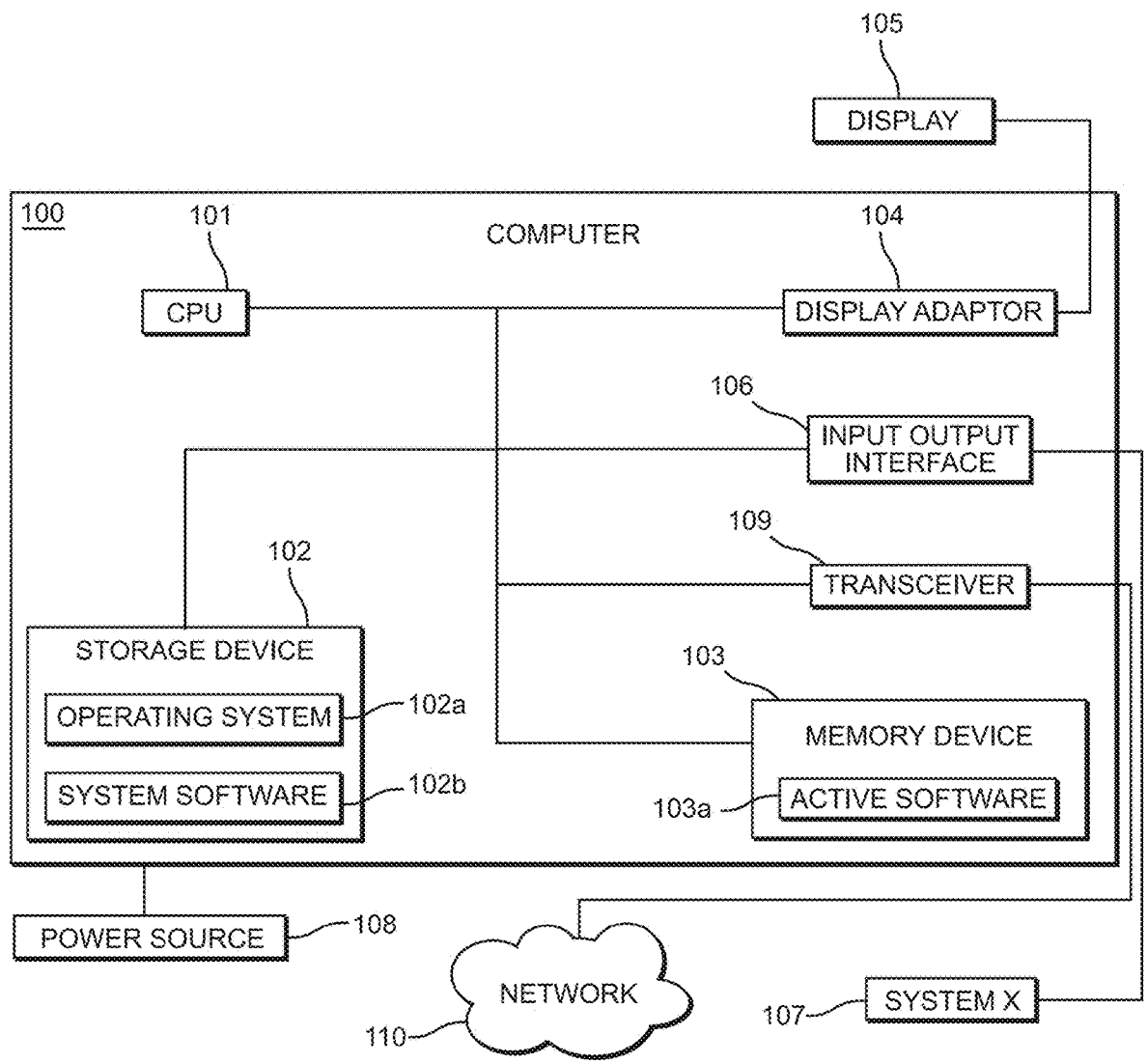
FIG. 1 shows a block diagram of a computing system.

Referring now to FIG. 1, there is shown a block diagram of a computing system. Computing systems may have many interchangeable parts or multiples of some parts. One of ordinary skill in the art will understand that the shown computer 100 is a basic computing system demonstrating a minimal amount of parts to allow for the computer to function. Computer 100 is exemplary, and one of ordinary skill in the art will recognize that computer 100 may be altered as necessary to render the presently disclosed system operable or to provide a peak performance of the disclosed system.

The parts described are each operably coupled together as necessary, one of ordinary skill in the art will understand how to connect general computer components, for example by use of a mother board or other computer board. In the shown embodiment the computer 100 includes a CPU 101. In one embodiment the CPU 101 includes only one processor. In other embodiments the CPU 101 may be made up of multiple processors. Different processors will allow for different computing power and speed.

The computer 100 includes at least one storage device 102. In different embodiments the at least one storage device 102 may be a solid-state storage device, a disk storage device, or another suitable storage device. One of ordinary skill in the art will recognize that there are several types of computing storage devices each providing well-known benefits and drawbacks. The at least one storage device 102 will store at least the computer operating system 102a and system software 102b. System software 102b may include any software necessary, or optionally, used to run any system described herein.

The computer 100 will have at least one memory device 103. One of ordinary skill in the art will recognize that there are several types of computing memory devices each providing well known benefits and drawbacks. The at least one memory device 103 will store at any active software 103a. Active software 103a may include the operating system 102a or parts of the system software 102b. The at least one memory device 103 may store the entire system software 102b size and speed permitting.

The computer 100 may also include various connection ports and types. The computer 100 may have a display adaptor 104. The display adaptor 104 will allow the computer 100 to connect to at least one display 105. In other embodiments multiple displays may be connected to the display adaptor 104. Similarly, the computer 100 may include at least one input/output interface 106. The input/output interface 106 will allow the computer 100 to connect to at least one system, referred to as System X 107 in FIG. 1. The input/output interface 106 may also allow for connection to only part of System X 107 or multiple systems. The computer 100 will also be operably connected to a required power source 108.

The computer 100 may also include a transceiver 109. In one embodiment the transceiver 109 is a wired transceiver. In another embodiment the transceiver 109 is a wireless transceiver. The transceiver 109 will allow the computer 100 to connect to a network 110. The network 110 may be an internet or an intranet connection. The network 110 will allow for the computer 100 to potentially connect to multiple other computing devices. In another embodiment the network may allow for the computer 100 to connect to multiple systems. In one embodiment the computer 100 will allow for System X 107 to be connected to the network 110.

Figure 2:
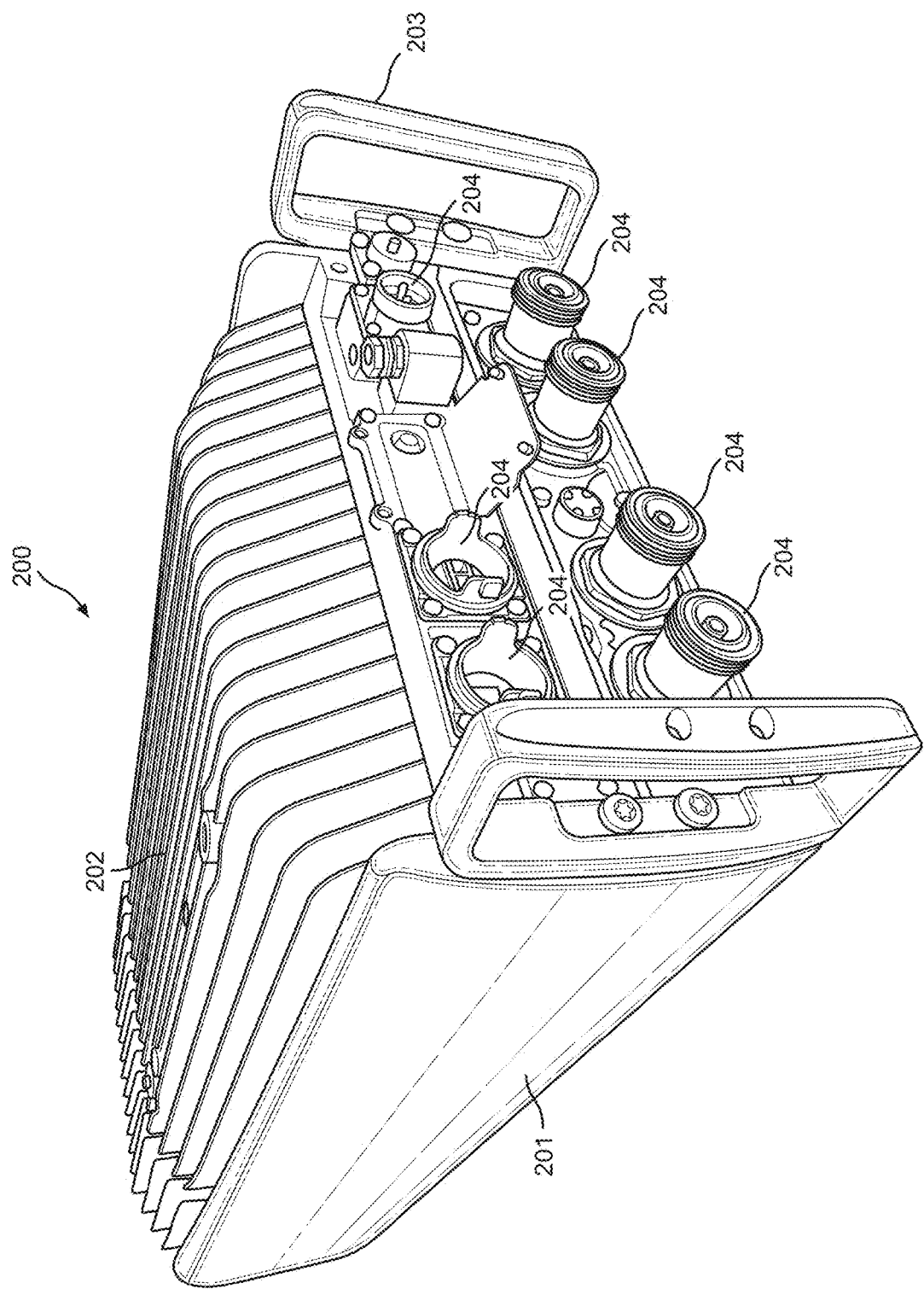
FIG. 2 shows an example of a remote radio head unit.

Referring now to FIG. 2, there is shown an example of a remote radio head unit. The shown remote radio head unit 200 is only an example or a radio head unit. There are many different models of radio heads produced by many different companies and manufacturers. Each one may have slight differences or different features. However, each remote radio head unit 200 will have at least several similar components in common.

Remote radio head unit 200 includes a housing 201 which contains at least some of the electronic components required. For example, but not shown, the remote radio head unit 200 may include a computer as described in FIG. 1. The computer will be connected to at least one radio antenna which may be capable of receiving or transmitting (or both) radio signals. In addition the housing 201 may include a heat reduction device 202 secured at least in part to the electronic components. In many remote radio head units 200 the heat reduction device 202 is a heatsink using fins. As air passes over the heatsink the device will be cooled. This prevents the use of cooling fans which can break more often, causing the need for additional repairs.

In some embodiments the housing 201 can include at least one handle 203. In one embodiment the handle can be used to lift the device. In another embodiment a special connector is used in order to lift the device. In some embodiments handles may double as connection protection. This will prevent the connections as described below from being damaged.

The remote radio head unit 200 includes several different electronical connections 204. The electrical connections 204 include power connections. These power connections will allow for the device to receive power. The electrical connections further include information connections, such as fiber optic connections. These information connections allow for mobile data to be sent and received from the remote radio head unit 200. Each of these types of connections may include different types of connectors or cables. However, the purposes described herein are required for the functionality of the remote radio head unit 200.

In different embodiments different additional connections may be present such as connectors to allow for the connection of a field test device. In some embodiments status lights are included with the remote radio head unit 200. These lights can allow for an individual to readily determine status of the unit without the need to connect a device.

Figure 3:
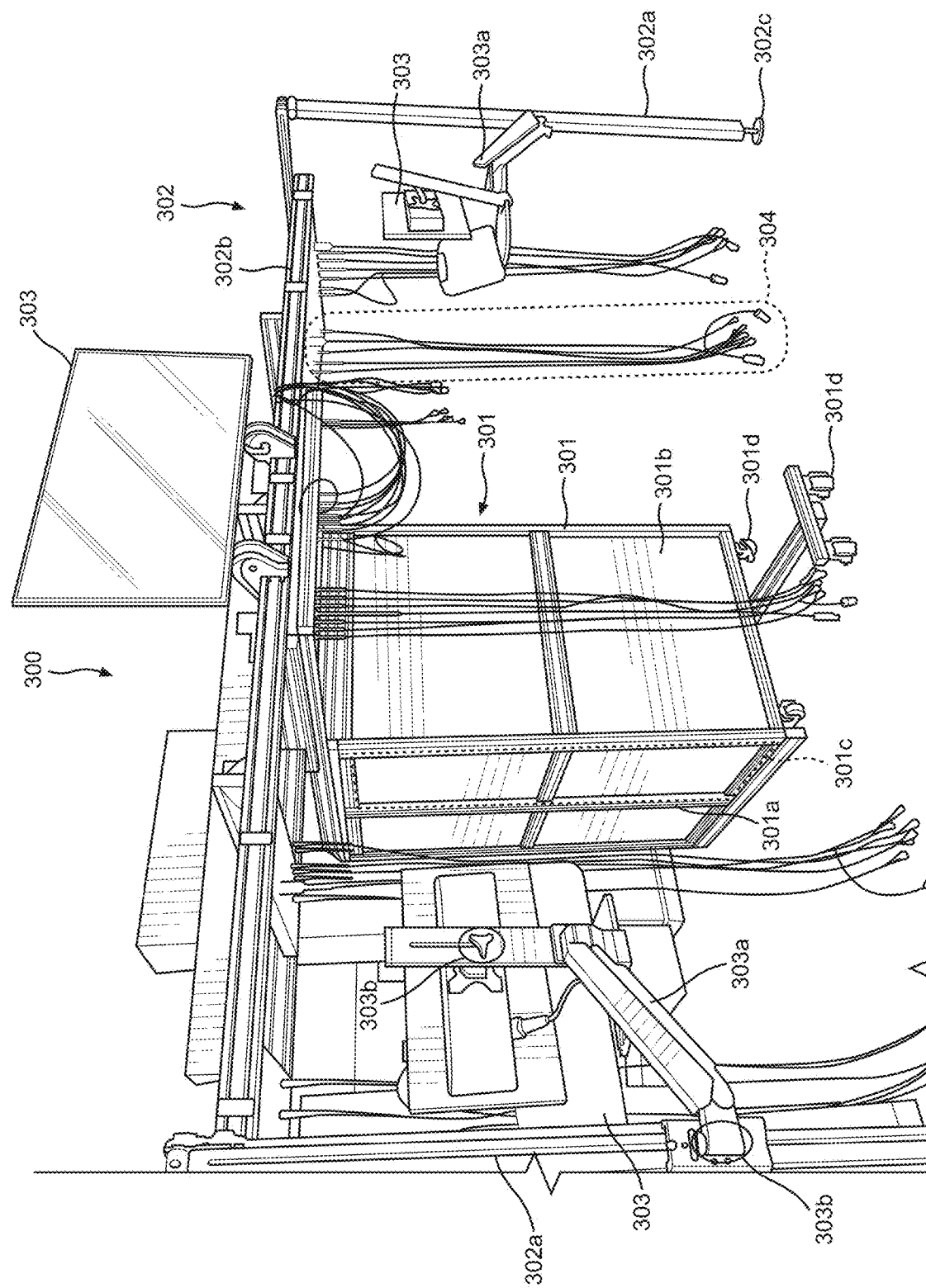
FIG. 3 shows a perspective view of an embodiment of a remote radio head unit tester.

Referring now to FIG. 3, there is shown a perspective view of an embodiment of a remote radio head unit tester. The remote radio head unit tester 300 includes a chamber 301. The chamber 301 is comprised of supports 301a, sidewalls 301b, and at least one door 301c. The chamber 301 is configured to have an interior volume. The interior volume will hold various electronic devices as will be described in the description of FIG. 5. In some embodiments the frame 301 has a plurality of wheels 301d located on a bottom side. The plurality of wheels 301d will allow for the chamber 301 to be easily moved.

The chamber 301 is connected to a frame 302. The frame includes a plurality of legs 302a. In the present embodiment the frame 302 includes two legs 302a and a cross structure 302b. In the shown embodiment the chamber 301 acts as an additional leg providing support to the frame 302. The cross structure 302b secures to each leg 302a and the chamber 301. In one embodiment each leg 302a includes a foot 302c. In one embodiment the foot 302c has an adjustable height which allows for the legs to provide support even on uneven ground.

The remote radio head unit tester may include at least one screen 303. The at least one screen 303 is operably coupled to the electronic equipment within the chamber 301. In the shown embodiment there are three screens 303. Each screen is secured to and supported by the frame 302. However, in other embodiments the screen 303 may have its own stand or other support structure, it does not need to be secured to the frame 302. In the shown embodiment two of the screens 303 are secured to the frame 302 via supports 303a. The supports 303a include a plurality of adjustment features 303b which all for the screens 303 to be adjustable. In the shown embodiment the adjustment features 303b include hinges, and a height adjustment feature. In various embodiments the screens 303 are configured to display test results from remote radio heads.

The remote radio head unit tester 300 includes at least one set of wires 304. In the shown embodiment the remote radio head unit tester 300 includes six sets of wires 304. Each set of wires is operable coupled to the appropriate electronic equipment located within the chamber 301. The set of wires 304 includes at least one power cable. The at least one power cable is configured to connect to a remote radio head. In different embodiments various power cables are included in the set of wires 304 having different electrical connections. Further, the set of wires 304 includes at least one data wire. The at least data wire is configured to connect to a remote radio head. In different embodiments various data wires are included in the set of wires 304 having different electrical connections.

Figure 4:
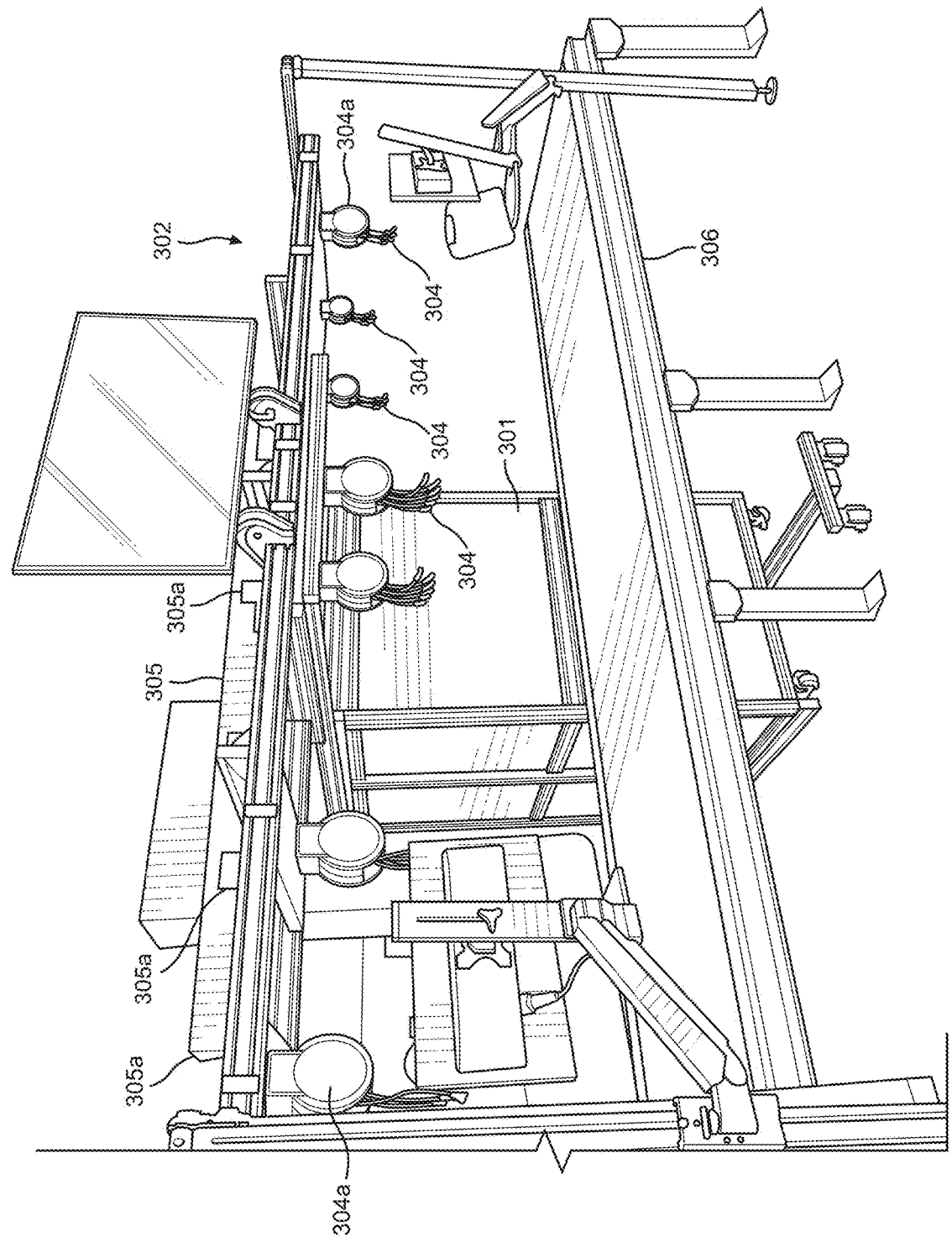
FIG. 4 shows a perspective view of an embodiment of a remote radio head unit tester.

Referring now to FIG. 4, there is shown a perspective view of an embodiment of a remote radio head unit tester. From this perspective a wire shroud 305 is shown. The wire shroud 305 will aid in keeping wires neat and protected as they enter the chamber 301. There are several openings 305a located within the wire shroud 305 in order to allow for the various sets of wires 304 to exit the shroud 305 along the frame 302.

In one embodiment various wires of the set of wires 304 are, at least in part, secured to the frame 302 via a wire retracting tool 304a. This wire retracting tool 304a will allow for wires of the set of wires 304 to be wound up when not in use. This will prevent wires from merely dangling from the frame 302. The wire retracting tool 304a can also serve as a safety feature in the shown embodiment.

The shown embodiment includes a conveyor 306. The conveyor is positioned to allow radio heads to be moved into range of the remote radio head unit tester 300. Remote radio heads can be extremely heavy and difficult to easily move. The conveyor 306 will allow for remote radio heads to be moved into position for testing then to be moved away from the remote radio head unit tester 300. In this embodiment the wire retracting tool 304a, can prevent wires of the set of wires 304 from being caught in the conveyor 306.

Figure 5:
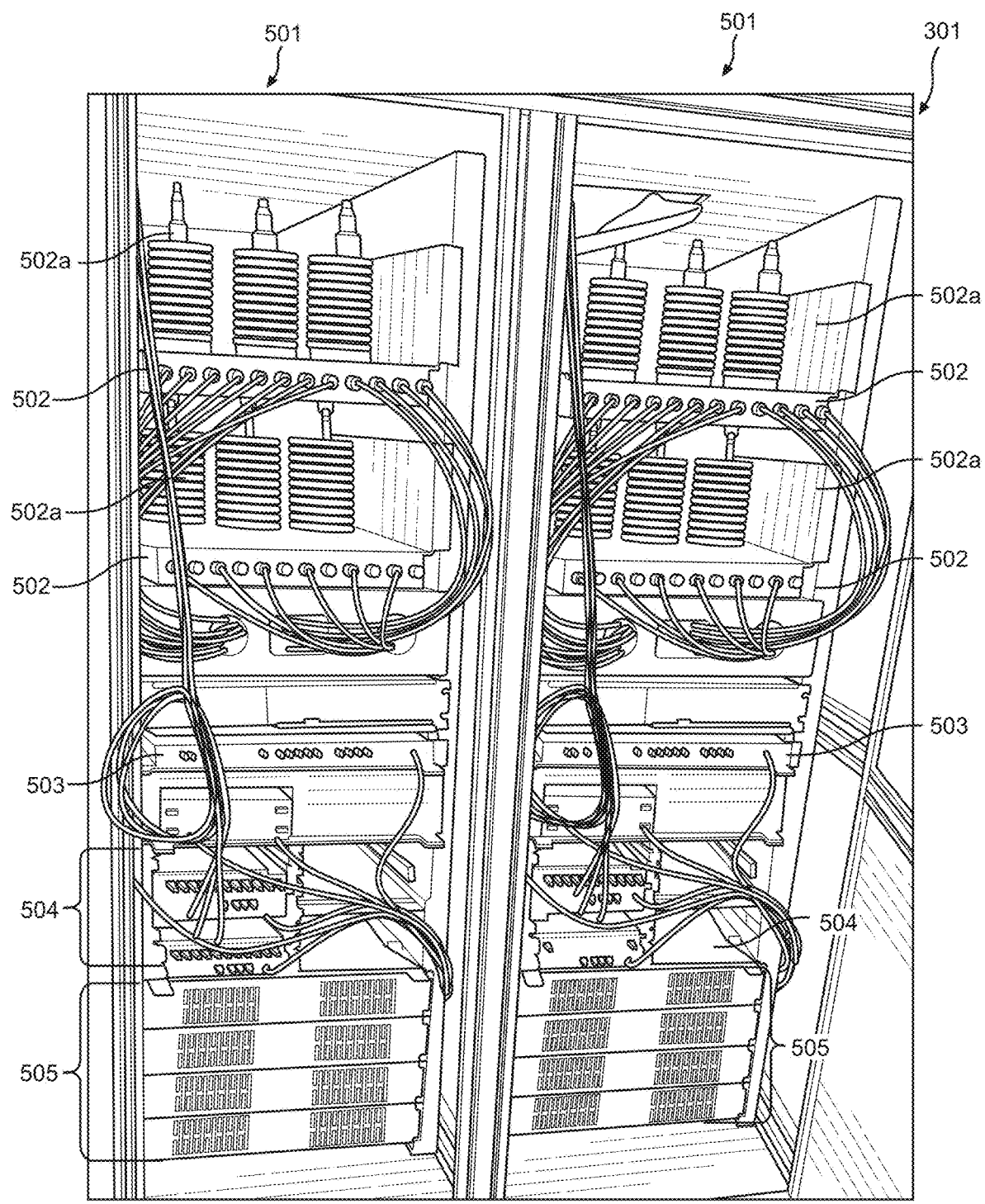
FIG. 5 shows a perspective view of an embodiment of the cabinet and contents for the remote radio head unit tester.

Referring now to FIG. 5, there is shown a perspective view of an embodiment of the cabinet and contents for the remote radio head unit tester. The chamber 301 of the remote radio head unit tester includes a plurality of different computers and servers. Due to the nature of the remote radio head unit tester 300 and the numerous types of remote radios heads, operated by numerous different companies, the types of computers and servers may differ significantly. Therefore, the specific types of equipment will not be detailed here. However, one of ordinary skill in the art will be able to determine which equipment is necessary. Equipment should be selected based on the types of remote radio heads to be tested. Further, in different embodiments specific equipment from the company who the remote radio head belongs can supply specific equipment to communicate with their remote radio heads. In other embodiments general equipment can be used.

In the shown embodiment the chamber 301 includes two server racks 501. In different embodiments different amounts of server racks 501 can be used without departing from the present invention. In one embodiment the various wire connections 502. These connections 502 will allow the various servers to connect to the sets of wires as described above. In the shown embodiment the wire connections 502 include specific connectors 502a to secure to the sets of wires. In some embodiments additional wires 503 directly connect to the servers. This removes the need for special connectors for the set of wires.

In the shown embodiment there are shown at least 3 different types of servers 503, 504, and 505. These different servers 503, 504, and 505 will allow the remote radio head unit tester 300 to properly connect to different remote radio heads. For example, server 505 can be a general computer 100. The general computer 100 can be used to store testing protocols. In this embodiment testing algorithms and computer software can be stored in the storage mediums of the computer 100. In many embodiments the computer 100 is operably connected to at least one display in order to run the remote radio head unit tester 300. Server 504 can then be used to properly talk to a first brand of remote radio head. When the first brand of remote radio head is properly connected to a desired set of wires, a user can tell the system to test that brand of remote radio head which will activate the server 504. If a second brand of remote radio head is be tested the same process can be followed, except the second type of service 503 will be activated to run the test.

Figure 6:
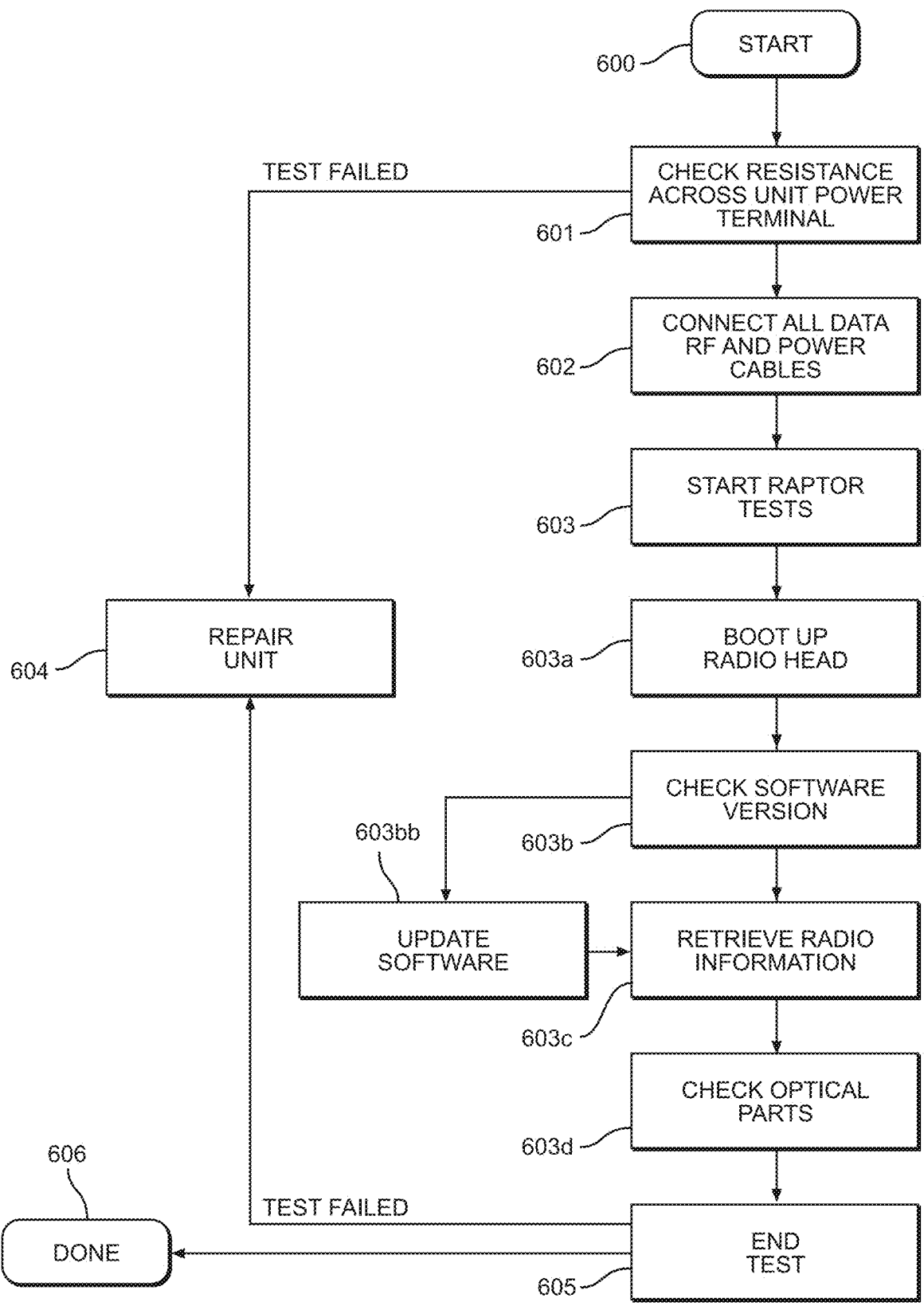
FIG. 6 shows a flow chart of an embodiment of the test procedure for the remote radio head unit tester.

Referring now to FIG. 6, there is shown a flow chart of an embodiment of the test procedure for the remote radio head unit tester. The method for testing a remote radio head may begin in different places. In one embodiment the method will begin once the remote radio head to be tested is placed in the desired location within the remote radio head unit tester 600. In other embodiments an individual may start the method 600 at another desired location. The method begins by testing the power connections of the remote radio head 601. In one embodiment the testing is conducted by checking that the connections have the proper resistance. In other embodiments different electric tests can be conducted. One of ordinary skill in the art will understand there are several methods to determine if electrical connections are functioning properly. Each of these methods will produce the desired answer of is the device properly receiving power. If the device's power connections fail the test the device is sent to repair 604. In one embodiment after any repair is conducted the device is sent back to the beginning of the method 600 to be retested. In another embodiment depending on the needed repair of the unit the unit may exit the test method.

After the electrical connection test is passed the remote radio head unit must be properly connected to the remote radio head unit tester 602. This includes connecting the proper power cables and information cables such as data cables and radio frequency cables.

Once the cables are properly connected the remote radio head unit tester may need to be properly configured depending on the type of remote radio head unit to be tested. After the proper configuration is completed the automated testing is started 603. In various embodiments throughout this testing process the testing results are show on screens of the device. The first step in the automated testing is to boot up the radio head 603a.

Once the radio is booted up the test checks the current software version 603*b*. In one embodiment the software is the most updated version. In this case the next step of the testing method is performed. In another embodiment the software is not up to date. In this case a software update is performed 603*bb*. In this embodiment the testing method may track and communicate to a user that a software update has been performed.

After the software is checked 603*b* and updated 603*bb* as needed the test method retrieves the radio head information 603*c*. This information may include any combination of the radio model, the serial number, and the most updated software version. In other embodiments additional information may be collected as determined to be necessary by the testing needs.

The final step in the testing method is to check the optical ports of the radio head 603*d*. This test ensures that the ports of the radio head are functioning properly. In different embodiments this test may be performed using specific equipment as used by the owner of the radio head. This can help ensure that the testing process is as accurate as possible. In other embodiments general equipment may be used.

During the optical ports test 603*d* several different test may be completed. In one embodiment the radio heads ability to transmit via a radio transmitter (Tx) is tested. In another embodiment the radio heads ability to receive radio waves via a receiver (Rx) is tested. In many embodiments radio heads have both of these capabilities and therefore both the Tx and Rx abilities of the radio head will be tested during step 603*d*.

After the optical port test 603*d* the automated testing method ends 605. If each of the automated tests are passed, then the testing method is completed 606. If a test is failed, the unit is sent to repair 604. After the repair the unit may reenter the testing method.

It is therefore submitted that the methods, systems, and devices have been shown and described in what is considered the most practical and preferred embodiments along with specific examples. It is recognized, however, that departures may be made within the scope and these present examples are not intended to be limiting. One of ordinary skill the art will be able to discern that obvious modifications can be made without departing from the scope or spirit.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Similarly, it is to be realized that, it is not intended for any method set forth herein to be construed as requiring that its steps be performed in a specific order, unless otherwise set forth in the claims.

Therefore, the foregoing is considered as illustrative only of the principles of the disclosure. Further, since numerous modifications and changes will readily occur to those skilled in the art, it is not desired to limit the invention to the exact construction and operation shown and described, and accordingly, all suitable modifications and equivalents may be resorted to, are deemed to fall within.

What is claimed:

1. A remote radio head unit tester, comprising:
   a chamber having an interior volume;
   the chamber encloses electrical components;
   at least one of the electrical components is a computer which has a testing algorithm installed thereon;
   a frame secured to the chamber, wherein the frame is comprised of a plurality of legs and a cross structure;
   at least one set of wires operably coupled with the electrical components.

2. The remote radio head unit tester of claim 1, further comprising: at least one screen operably connected to the electrical components.

3. The remote radio head unit tester of claim 2, wherein the screens are configured to show the test results of the remote radio head test.

4. The remote radio head unit tester of claim 1, wherein the cross structure allows for each set of the at least one set of wires to be suspended therefrom.

5. The remote radio head unit tester of claim 1, wherein at least one wire of the at least one set of wires is connected to a wire retracting tool.

6. The remote radio head unit tester of claim 1, further comprising at least one server rack located within the chamber.

7. The remote radio head unit tester of claim 1, wherein the electrical components include, in addition to the at least one computer, at least wire connection and at least one server.

8. The remote radio head unit tester of claim 1 further comprising a conveyer.

9. The remote radio head unit tester of claim 8, wherein the conveyer is positioned such that it moves at least one remote radio head into a position such that it can be connected to the at least one set of wires.

\* \* \* \* \*